Dec. 24, 1968    W. N. BOVENIZER    3,418,562
TAP CHANGING OF PARALLELED TRANSFORMER WINDINGS
Filed April 14, 1966

INVENTOR
WILLIAM N. BOVENIZER
BY
Andrus & Starke
Attorneys

United States Patent Office 3,418,562
Patented Dec. 24, 1968

3,418,562
TAP CHANGING OF PARALLELED
TRANSFORMER WINDINGS
William N. Bovenizer, Zanesville, Ohio, assignor to
McGraw-Edison Company, Milwaukee, Wis., a corporation of Delaware
Filed Apr. 14, 1966, Ser. No. 542,643
7 Claims. (Cl. 323—43.5)

ABSTRACT OF THE DISCLOSURE

The present invention relates to an autotransformer having a pair of paralleled matched windings. A separate tap switch is connected in series with each winding. The circuit forces an essentially equal division of the current through the paralleled switches such that the combined capacity is equal to the sum total of the individual capacities of the two switches.

---

This invention relates to a switching circuit for parallel windings and particularly to an improved circuit employing tap switches in series with each winding in order to force equal current division between paralleled switches.

In power distribution systems, requlating apparatus or devices are often employed to compensate for variations in the voltage of the power source and for changes in the circuit conditions or voltage drops which may result from load demand fluctuations. Highly satisfactory tapped winding units have been devised for stepping up or down the load side voltage in response to automatic sensing devices or the like. One highly satisfactory system in an autotransformer is provided having a series tapped winding with the winding selectively connected in the circuit through suitable tap switches. Such devices have a selected current carrying capacity and in order to increase the current capacity pairs of switches in parallel have been suggested to connect the winding tap point to the main circuit sections. However, if the circuits are not carefully constructed, current unbalance conditions may be created wherein one switch carries more current than the other and the total current capacity of the system is less than double the capacity even though both switches are of the same size.

The present invention is particularly directed to a relatively reliable winding and circuit connection which will insure essentially equal current division through the switches and thereby provide a capacity equal to the sum of the individual switches. Generally, in accordance with the present invention, the paralleled windings are wound as identical tapped windings in side-by-side relationship. The windings are separately and similarly tapped and are connected to tap switches of the same size. The tap switches are interconnected for simultaneous and corresponding positioning.

This design provides two or more essentially perfectly matched windings which are selectively connected in parallel through the separate tapped switches. Consequently, circulating currents are essentially eliminated and equal division of the current through the tapped switches is provided. In a preferred construction, the wires for the paralleled coils are helically wound in side-by-side relation and taps are brought out separately from each of the coils to the tap switches. In a voltage regulator the end taps of the series windings are connected together at the tap switches and the taps from the two windings are selectively interconnected by the separate tap switches. A common drive for the tap switches is provided to insure simultaneous and corresponding positioning thereof.

This circuit has the distinct advantage of forcing essentially equal division of the current through the paralleled switches, particularly during a switching cycle.

The drawing furnished herewith illustrates a preferred construction of the present invention in which the above advantages and features are clearly disclosed as well as others which will be clear from the following description.

Figure 1:
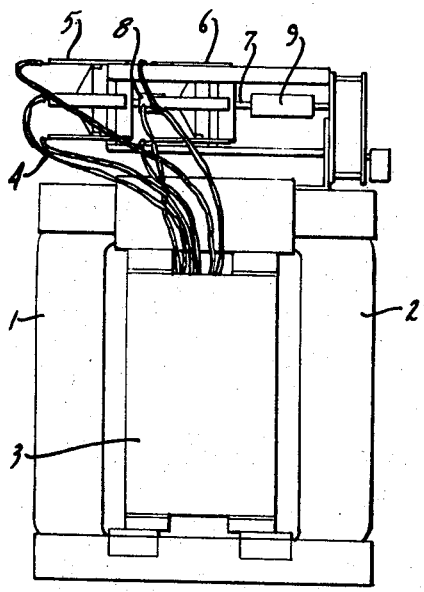
FIG. 1 is a diagrammatic view of an autotransformer unit illustrating one physical arrangement employing the present invention.

Referring to the drawings and particularly to FIG. 1, the present invention is illustrated in connection with a series winding voltage regulator which may be employed for regulating the load side voltage in a power distribution system. Generally, the regulating structure includes integrated rectangular core units 1 and 2 and a coil assembly 3 on the center leg formed by the two core units. The coil assembly 3 includes a plurality of tapped leads 4 from the series winding as more fully described hereinafter which are connected through tapped switches 5 and 6 for lowering or increasing of the load side voltage. In addition the coil contains a shunt winding and usually a control winding. Referring to FIG. 1, the tapped switches 5 and 6 include a rotating input shaft 7 coupled through a suitable coupling 8 to a common drive shaft 9. Generally, in a practical system, a suitable electronic control or the like, not shown, will sense the line voltage and operate a tap changer motor, not shown, for simultaneous positioning of the tapped switches 5 and 6 to a corresponding position. As such systems are well known to those skilled in the art, a detailed system is not shown and no further description thereof is given.

The coil assembly 3 shown in FIG. 1 is particularly constructed in a special manner in accordance with the present invention. Further, the coil assembly 3 is constructed in the illustrated embodiment of the invention with the coil winding as described in detail with the corresponding elements of the coil windings identified by numbers and similar primed numbers, as shown in FIG. 3.

Figure 2:
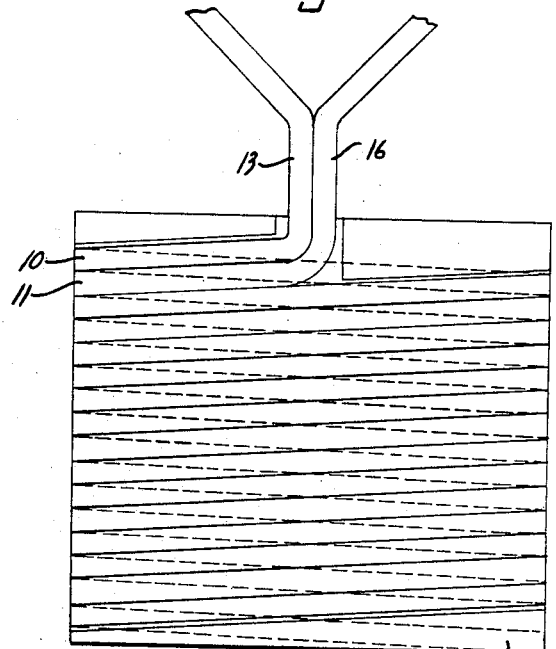
FIG. 2 is an enlarged diagrammatic view of the coil assembly shown in FIG. 1.

Referring particularly to FIG 2, the coil assembly 3 includes a pair of individual series windings 10 and 11. The wires for the paralleled series windings 10 and 11 are helically wound in side-by-side relationship on a suitable winding form 12. The individual leads are tapped to corresponding or the same points on the windings, as shown schematically in FIG. 3, and connected to the separate tap switches 5 and 6 to interconnect the windings 10 and 11 in a parallel circuit arrangement with each other and in series with the corresponding windings 10' and 11' of the coil assembly.

Figure 3:
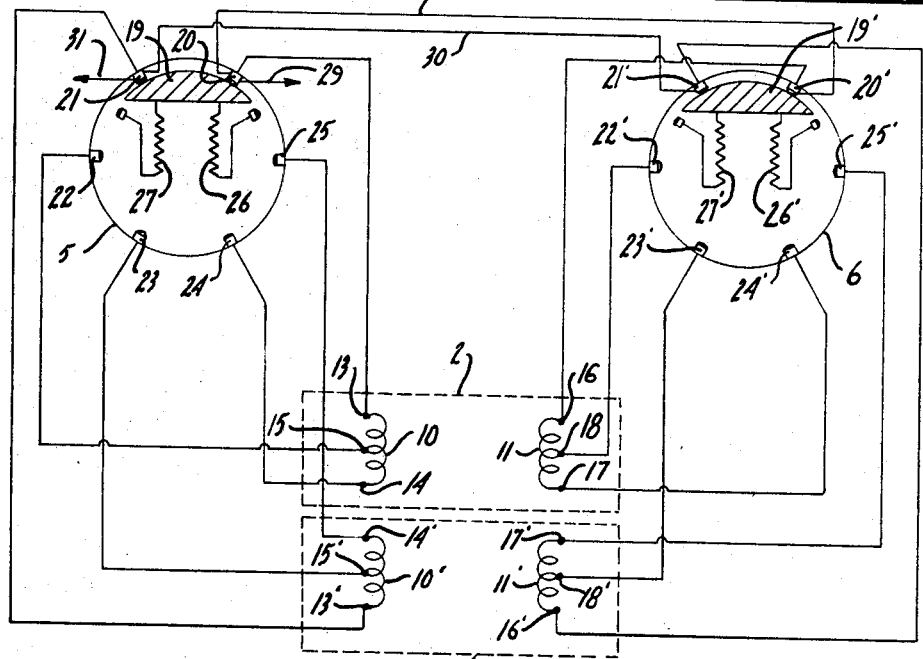
FIG. 3 is a schematic circuit diagram illustrating a typical application employing the structure and circuit connection of the present invention.

A typical circuit connection is shown in FIG. 3 wherein the series winding of a voltage regulator consists of two parallel identical windings wound as shown in FIGS. 1 and 2 for connection as a single phase autotransformer.

Referring particularly to FIG. 3, the windings 10 and 11 of the illustrated embodiment have three taps including end taps 13 and 14 and an intermediate tap 15 on winding 10 and similar end taps 16 and 17 and intermediate tap 18 on winding 11. Taps 13 through 15 are connected to switch 5 and taps 16 through 18 are connected to switch 6. Windings 10' and 11' are similarly wound over series windings 10 and 11 and tapped and connected to the switches 5 and 6.

In FIG. 3, tap switches 5 and 6 are similarly shown and switch 5 is described with corresponding elements of switch 6 identified by similar primed numbers. A rotatably mounted tap contact 19 is located to selectively bridge adjacent fixed contacts 20 through 25 which are equicircumferentially distributed about the axis of rotation for contact. The contact 19 generally includes an arcuate contact face which simultaneously engages two adjacent fixed contacts at any one time. The contact 19 is preferably provided with a snap-action actuator, not shown. In accordance with known practice, protective bridging resistors 26 and 27 are connected to the rotating contact 19.

The fixed contacts 20 through 25 are connected to the taps 13 through 15 and 13' through 15' of windings 10 and 10'. Thus, tap 13 is connected to contact 20, tap 13' to contact 21, tap 15 to contact 22, tap 15' to contact 23, tap 14 to contact 24 and tap 14' to contact 25.

The switch 6 is similarly formed with its contacts 20' through 25' connected to the contacts 16 through 18 and 16' through 18' in the same manner.

A jumper lead 28 interconnects fixed contacts 20 and 20' to provide a common power connection to the ends of the windings 10 and 11 at the switches 5 and 6. A power lead 29 is shown at contact 20. Similarly, the corresponding ends of the windings 10' and 11' are interconnected to each other by a jumper lead 30 and between contacts 21 and 21' and to a power lead 31.

In the embodiment of the invention shown in FIG. 3, the contacts 19 and 19' are shown bridging the corresponding fixed contacts 20, 21 and 20' and 21', respectively. The circuit is then directly from the one power lead 29 to the opposite power lead 31, through the switches 5 and 6 in parallel, as follows. Power lead 29 is connected to contact 20 and through lead 28 to contact 20' such that the current divides through the two tap switches 5 and 6 to the lead 31. In this position, the paralleled windings are effectively disconnected and the two switches are directly paralleled between the lines 29 and 31.

Rotation of the tap switches 5 and 6 to place the contacts 19 and 19' bridging the second and third contacts 21 and 22 and 21' and 22' results in insertion of the portion of the windings 10 and 10' between the winding taps 13 through 15 and 13' through 15' in parallel with each other. This circuit is traced from line 29, to tap 20 of switch 5 and to tap 20' of switch 6 to the corresponding taps 13 and 16 of the windings 10 and 11, through the windings 10 and 11 to taps 14 and 18 and back to the contacts 22 and 22' of switches 5 and 6 which are now connected by the rotatable contacts 19 and 19' to contacts 21 and 21' and therefore to line 31. Consequently, the current flow is through two parallel paths, each of which includes an identical winding portion in series with the related tap switch 5 or 6.

Further, counterclockwise rotation of the rotatable contacts 19 and 19' bridge the fixed contacts 22 and 23 and 22' and 23' with an insertion of the windings 10' and 11' connected between taps 13' through 15' and 16' through 18' in series with the corresponding portions of the windings 10 and 11.

The next step of the rotatable contacts 19 and 19' to bridge contacts 23 and 24 results in the parallel paths including the complete windings 10 and 11 in series with the portions of windings 10' and 11' between the contacts 13' through 15' and 16' through 18' respectively. In the final position with contacts 19 and 19' bridging contacts 24 and 25, the parallel paths include the series connection of the windings 10 and 10' and the windings 11 and 11'.

Thus, in all positions with the exception of the initial starting position and when the windings are completely separated from the circuit, the paralleled tap switches 5 and 6 are connected one each in each of the parallel branches in series with at least a portion of the windings 10 and 10' or 11 and 11'. In the initial condition shown, the top switches 5 and 6 tend to carry equal currents as an increased current establishes a corresponding increase in contact drop thus tending to stabilize the steady state condition. The present invention is of particular significance during switching because of the dynamic characteristics established by arcing across the contacts. The present invention forces a reasonable division of current through the tap contacts as a result of the series connection of the paralleled windings connected on the corresponding core structure. This becomes particularly significant in connection with the tap switches as shown which employ protective resistors during the switching period.

The coil assembly 3 may also be wound with an inner secondary section, not shown, and an outer primary section with the primary section interconnected to form a pair of paralleled primary windings. The tap switches 5 and 6 switch the primary sections to change the transformation ratio as required. Self-regulating transformers could be built in this manner.

Thus, in summary, the combination of the paralleled winding and switches particularly with the winding simultaneously wound in side-by-side relation provides an improved switching means for parallel windings in transformers and the like.

Various modes of carrying out the invention are contemplated as being within the scope of the following claims particularly pointing out and distinctly claiming the subject matter which is regarded as the invention.

I claim:
1. In a winding assembly;
    at least a pair of similar windings each having a similar plurality of taps,
    at least a pair of similar tap switches one for each winding and separately connected to the taps of the corresponding winding,
    means to similarly position said tap switches,
    a pair of power terminals, and
    circuit means connecting the corresponding ends of said windings and said switches between the pair of power terminals in parallel circuit each branch of which includes one winding in series with one tap switch for individually and separately inserting each winding in the corresponding branch of the parallel circuit.
2. The winding assembly of claim 1 wherein said windings are substantially identical.
3. The winding assembly of claim 1 wherein each parallel path is to carry identical load current such that the combined capacity is equal to the sum of the individual paths, said windings being essentially identical and wound as helical windings with the individual turns of each immediately adjacent the corresponding turns of the other.
4. In a transformer assembly having a winding means to be selectively connected in circuit under load;
    a pair of similar transformer windings having the corresponding end turns interconnected to form a pair of power common terminals with said windings connected in parallel, each of said windings having a plurality of taps,
    a pair of tap switches, one for each of the windings and adapted to selectively interconnect said taps to vary the internal connections of said windings, and
    means to simultaneously and similarly position said tap switches whereby said windings are each connected in series with the corresponding tap switch between said common terminals.
5. The transformer assembly of claim 4 wherein said windings are essentially identical and wound as coplanar helical coils with the turns of each winding immediately adjacent the corresponding turns of the adjacent winding and thereby connecting each switch in series with identical windings having essentially identical resistances and reactances and essentially zero leakage reactance.
6. In a winding assembly:

a pair of similar windings each having a similar plurality of taps, a pair of similar tap switches one for each winding and each including a plurality of taps separately connected to the taps of the corresponding winding and each including a movable contact connecting any two adjacent contacts of the corresponding switch, means to similarly position said movable contacts of said tap switches, and circuit means connecting the windings and switches in parallel circuit each branch of which includes one winding in series with one tap switch.

7. The assembly of claim 6 wherein protective resistors are connected to the movable contact and ground.

References Cited

UNITED STATES PATENTS

| 2,434,503 | 1/1948 | McCarty | 323—43.5 |
| 2,484,576 | 10/1949 | Minneci | 323—43.5 |
| 2,770,767 | 11/1956 | Nelson | 323—43.5 |
| 3,036,258 | 5/1962 | Friedrich | 323—49 X |
| 3,083,331 | 3/1963 | Spurway | 323—49 |
| 3,349,320 | 10/1967 | Mathes | 323—43.5 |

J D MILLER, *Primary Examiner.*

WARREN E. RAY, *Assistant Examiner.*

U.S. Cl. X.R.

323—47